United States Patent [19]

Schoeneweis

[11] 4,106,170

[45] Aug. 15, 1978

[54] METHOD OF ASSEMBLING A COUPLING

[75] Inventor: E. Frederick Schoeneweis, Coraopolis, Pa.

[73] Assignee: Rockwell International Corporation, Pittsburgh, Pa.

[21] Appl. No.: 738,634

[22] Filed: Nov. 3, 1976

[51] Int. Cl.² .................. B23P 15/00; F16K 31/50
[52] U.S. Cl. .................. 29/157.1 R; 29/407; 29/436; 251/77; 251/330; 403/138; 403/146; 403/166
[58] Field of Search ............ 29/157.1 R, 157.1 A, 29/407, 436, 450; 251/77, 79, 80, 330; 403/146, 166, 165, 111, 138, 144

[56] References Cited

U.S. PATENT DOCUMENTS

| 3,024,403 | 3/1962 | Safford | 251/134 |
| 3,107,417 | 10/1963 | Jaquish, Jr. et al. | 29/407 |
| 3,342,451 | 9/1967 | Matousek | 251/77 |
| 3,554,483 | 1/1971 | Kuwik et al. | 251/77 |

Primary Examiner—C.W. Lanham
Assistant Examiner—Daniel C. Crane

[57] ABSTRACT

A method of limiting backseat loading on a valve stem moved between a lower closed position and an upper open position engaging the backseat by an actuator having an upper stop position wherein the method includes the steps of setting a variable force transmitting coupling to a predetermined loading between a bearing surface and a gauging surface thereon, connecting the coupling to the valve stem in the lower closed position, lowering the actuator from the upper stop position, connecting the coupling to the actuator, raising the actuator to the upper stop with the backseat being below the upper open position, and increasingly connecting the coupling to the valve stem and the actuator until the backseat is engaged and the predetermined loading exceeded as ascertained by separation of the gauging surface from the bearing surface.

7 Claims, 1 Drawing Figure

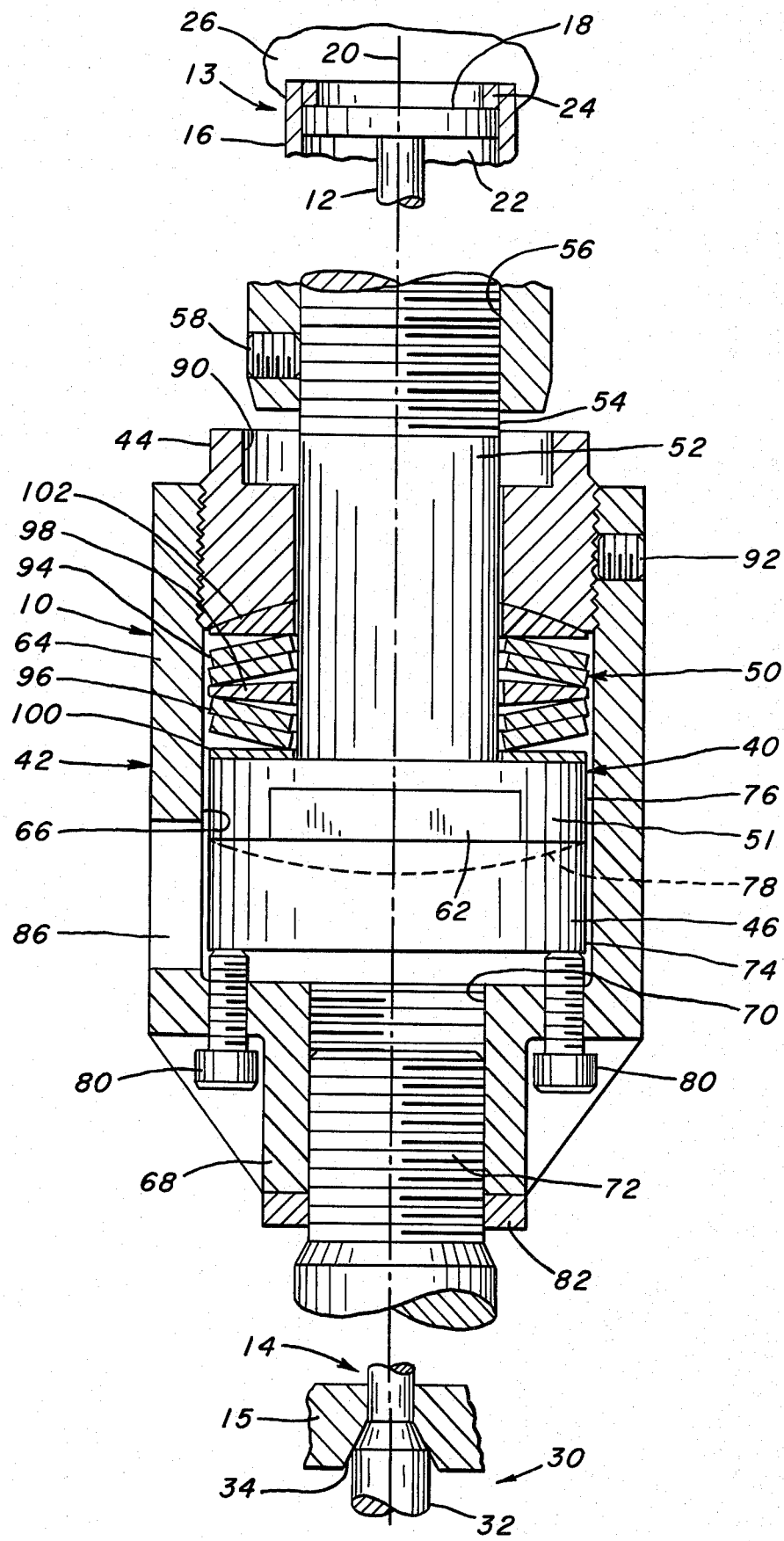

METHOD OF ASSEMBLING A COUPLING

BACKGROUND OF THE INVENTION

The present invention relates to couplings for limiting the loading on the valve backseat and, in particular, a method of limiting backseat loading on an actuator operated valve stem to a predetermined loading.

A coupling for limiting the forces applied to an actuator operated valve stem during backseating is disclosed in the copending application U.S. Ser. No. 663,786 entitled VALVE-ACTUATOR COUPLING filed on Mar. 4, 1976 in the name of T. E. Kunkle and assigned to the Assignee of the present invention. Therein, in order to limit the force transmitted to the backseated valve stem under certain abnormal operating conditions, a limitedly deflectable coupling is provided at the operative connection between actuator and the stem to accommodate variable axial stop positions while limiting loading therebetween, both at the backseat stop position and during the valve stem movement.

The coupling includes internal Belleville springs disposed in a lost motion connection between limitedly axially movable fittings of the coupling. The arrangement is such that, during closing movement on the valve stem, a direct compressive force is applied. Upon initial unseating of the valve, the spring is increasingly deflected until fully compressed after which load direct tensile forces were applied to the stem. After unseating, the load is reduced during opening movement. When the stem arrives at the backseated position, the spring increasingly deflects until the actuator reaches its stop position. The stop positions on the valve stem and the actuator limit spring deflection when the members are at these positions to insure that the backseat loading is at substantially the predetermined level. This is accomplished by establishing predetermined spacial relationships of the coupling components based on the assumption that the stops are within a predetermined tolerance. This is sought to be achieved by interrelating the operative positions of totally internally captured parts, and not by actually providing an affirmative loading adjustment. The loading control is thus only within the rough limits provided by stack-up tolerances on the referenced parts.

The present invention, on the other hand, provides a coupling design which is presetable to a predetermined loading level and which can be field assembled between the valve and actuator in a manner which assures that when the valve is backseated the loading level is not exceeded. More particularly, the present coupling comprises first and second fittings operatively interconnected at a lost motion connection and respectively connected to the valve stem and the actuator. A Belleville spring assembly, operatively interposed in the lost motion connection, provides limited resilient deflection upon relative axial separation of the fittings. Load adjustment screws are provided on the fittings for deflecting the spring assembly an amount corresponding to a desired loading condition between the members. A loading interface is provided which is operator viewable through an access window. The loading level is such that when the valve stem is backseated, an interface separation then exists indicative that the level has been exceeded.

The coupling is operatively assembled by threadedly connecting the inner fitting to the actuator end with the spring assembly and an adjusting collar loosely received thereover. The outer fitting includes a bearing block telescoped over the actuator. The mounted components and the collar are threadedly connected until internal components are in axial contact so as to take only any axial clearances and provide a slight loading at the fully extended position. The outer fitting is then locked to the inner fitting. A plurality of axial adjusting screws are then adjusted to deflect the spring assembly until the predetermined loading level is established between the inner fitting and the bearing block. The interface between the inner fitting and the bearing block is observable through a window in the side of the outer fitting. The actuator is then lowered until the outer fitting engages the threaded end of the valve stem. The outer coupling is then threaded slightly onto this threaded end and the actuator is retracted to its upper stop position. The extension provided by the coupling at this point is such that the valve end is spaced from the backseat and the springs are not deflected. The outer fitting is then rotated to increasingly thread the coupling onto the valve end until first, the valve is backseated and second, upon further threading, the interface separates indicative that the loading level has been reached. The fitting is then locked onto the valve end such that the inner and the outer fittings are fixedly connected to their respective actuating members. The adjusting screws are then removed. Thus, each time the valve reaches the backseated position, the load on the stem will be limited to a predetermined level. In the event of actuator failure, inasmuch as the actuator end is fixed, the force transmitted thereto is borne by the actuator assembly without any load increase on the valve stem. Thus, with the above coupling and method of assembly, the valve backseat loading can be readily and accurately achieved and thereafter limited.

The above and other features of the present invention will be apparent to those skilled in the art upon reading the following detailed description, reference being made to the accompanying drawing in which the single FIGURE is an axial cross sectional view of a coupling made in accordance with the present invention, operatively connected to the valve stem and the actuator rod, with a valve backseat and the upper actuator stop schematically illustrated.

DETAILED DESCRIPTION OF THE DRAWING

Referring to the drawing, a coupling 10 constitutes the operative interconnection between an actuator rod 12 of an actuator 13 and a valve stem 14. The operative environment for such an application is disclosed in the copending application U.S. Pat. Ser. No. 663,786 entitled VALVE ACTUATOR COUPLING filed in the name of T. E. Kunkle on Mar. 4, 1976 and assigned to the assignee of the present invention. A suitable actuator is disclosed in the copending application, U.S. Ser. No. 663,787, now abandoned, entitled VALVE ACTUATOR, filed in the name of D. W. Duffey on Mar. 4, 1976 and assigned to the assignee of the present invention.

Generally, the actuator 13 is mounted on the valve body 15 and includes an operating cylinder 16 in which a piston 18 is mounted for axial movement along an axis 20. The underside of the piston 18 is exposed to fluid pressure in a chamber 22 suitably controlled to selectively bias the piston 18 between an upper stop position wherein the top surface of the piston 18 engages a stop collar 24 at the upper end of cylinder 16 and a lower position wherein the valve disk of the valve is in the fully closed seated position. The top side of the piston 18 is exposed to fluid pressure from an accumlator chamber 26 described in greater detail in the aforementioned application. Upon a signal or abnormal decrease of pressure in chamber 22, the pressure in the accumulator chamber 26 is effective to drive the piston 18 to the lowered position. The actuator rod 12 is fixedly connected to the lower surface of the piston 18.

The valve stem 14 is operatively disposed with respect to the valve and has its lowermost end connected to a valving element the details of which dependent on the particular valve application. The valve stem 14 is movable between the illustrated upper open position and a lower closed position wherein the valve disk is seated to close an associated fluid passage in the valve body. In the illustrated upper position, a frusto-conical collar or backseat 32 engages a mating conical surface 34 in the valve body to provide a sealing interface along the stem to the exterior of the valve. Inasmuch as the valve stem above the region of the backseat is smaller in cross section, it constitutes a structurally weaker portion of the valve stem and accordingly it is desirable to limit the loading thereon, particularly, if abnormal conditions exist in the actuator causing a loss of pressure in chamber 26 such that the resultant force transmitted would be directly transmitted to the valve stem. A coupling 10 made in accordance with the present invention is operative in assembly to limit backseat interface loading to a predetermined amount as hereinafter described.

The coupling generally comprises an inner fitting 40 and an outer fitting 42, operatively interconnected by an adjusting collar 44 and internally including a bearing block 46 and a spring assembly 50.

The inner fitting 40 includes an enlarged cylindrical T-head section 51 and a cylindrical shank 52. The shank 52 has a threaded end 54 adjustably threadably received in a threaded bore 56 in the lower end of the actuator rod 12 and locked thereto by means of a set screw 58. The T-head section 51 includes a pair of dyametrically spaced wrench flats 62.

The outer fitting 42 comprises a cylindrical sleeve 64 having an internal bore 66 and terminating in a neck section 68 having a threaded hole 70 into which an upper threaded end 72 of the valve stem 14 is threadedly connected.

The bearing block 46 is slidably supported in the bore 66 and has an outer cylindrical surface 74 slightly smaller in diameter than the bore 66 and substantially the same as the outer cylindrical surface 76 of the head section 61. The bearing block 46 and the head section 51 are formed with mating spherical surfaces which define a spherical interface 78. A plurality of adjusting screws 80 are axially threaded through tapped holes in the neck 68 and engage the planar circular lower surface of the bearing block 46 for purposes hereinafter described.

The outer fitting 42 is fixedly connected to the threaded end 72 by means of a lock nut 82 threaded over the end 72 and compressively engaging the top annular surface of the neck section 68. A circular window 86 is formed in the sleeve 42 generally in axial alignment with the interface 78 between the bearing block 46 and the head section 51 and the ends of the screws 80 and the bottom surface of the bearing block 46. Through this window an operator can ascertain when a predetermined loading condition has been exceeded.

The adjusting collar 44 includes a threaded outer surface which is threadably adjustably received in a threaded end in the sleeve 64. The collar 44 is centrally apertured and slidably receives the shank 52 of the inner fitting 40. The collar 44 includes a counterbore 90 which is adapted to telescopically receive the lower end of the actuator rod 12. The collar 44 is fixedly locked to the outer fitting by means of a set screw 92.

The spring assembly 50 comprises upper and lower sets of Belleville springs 94 and 96 respectively separated by a double tapered spacer member 98. The outer apex rim of the spring set 96 engages a hardened annular washer 100 adjacent the section head 51 and the outer apex rim of the spring set 94 engages a hardened washer 102 having a spherical surface engaging a concave spherical surface in the collar 44. The base rims of the spring sets 94, 96 engage the spacer member 98. The spacer member 98 limits the deflection of the Belleville springs so as to prevent overstressing of the latter as described in the copending application Ser. No. 738,366, now U.S. Pat. No. 4,074,542, entitled COUPLING filed concurrently herewith in the name of Andrew Hankosky, et al, and assigned to the assignee of the present invention.

The above arrangement is such that the springs may be initially deflected by means of the screws 80 to establish a predetermined loading between the inner fitting 40 and the outer fitting 42. When a tensile force is applied between the two fittings at a level which exceeds the preload, the bearing block 46 will disengage from the screws 80 and the head section 51, an event which can be visually ascertained or felt by means of a suitable feeler gauge through the window 86.

The coupling 10 is assembled to the actuator rod and the valve stem with the valve initially in the lowered position and the actuator initially in the upper stop position. More particularly, the spring assembly 50 and the adjusting collar 44 are assembled over the shank 52. The threaded end 54 is threaded into the threaded hole 56 by means of a wrench engaging the flats 62. When the shank 52 has been threaded sufficiently to handle anticipated loading, the inner fitting 40 is locked to the actuator rod 12 by tightening the set screw 58.

The outer fitting 42 with the adjusting screws 80 removed or backed off and the bearing block 46 loosely disposed therein is initially threaded onto the exterior threads of the collar 44. The collar 44 is threaded in the outer fitting 42 by the manual rotation of wrench engaging the flats on the outer surface of the collar 44. The collar 44 is tightened until all axial clearances have been taken up and, if desired, until a slight loading of the springs has been effected. However, this initial loading is not necessary and if desired, an additional lost motion connection beyond that provided by the deflection of the springs may be established. In any event, when the collar 44 has been suitably threaded into the outer fitting, the collar is locked thereto by means of the set screw 92.

At this point, the screws 80 are tightened until they engage the surface of the block 46. They are then tightened a predetermined number of turns to effect a predetermined deflection and corresponding preloading of the springs 50.

The lock nut 82 is then threaded over the end 72 and the actuator rod is lowered from the upper stop position until the neck section is in engagement and alignment with the end 72. The collar 44 and the fitting 42 are rotated by rotation of the collar 44, accommodated by the spring assembly 50 relatively rotating with respect to the head 51. The rotation is sufficient to provide a threaded engagement such that the actuator can be shifted to the upper stop position and the valve disk unseated from the valve seat.

When the actuator has reached the upper stop position, the outer fitting is increasingly threaded onto the end 72 until first, the backseat 32 engages the surface 34 and second, the bearing block 46 separates from the gauging surfaces at contacting surfaces of the screw 80 or the head section 51 separates from the bearing block 46 at the interface 78. The fact that the preload has been exceeded can be visually ascertained by inspection through the window 86 and additionally confirmed or ascertained by means of feeler gauges at the separable surfaces. When separation has occurred, it is assured that the valve is, in fact, backseated and that a load substantially the same as the preload has been achieved. Fitting 42 is then locked into position on end 72 by tightening lock nut 82 against neck section 68 by rotation of said lock nut. The screws 80 are thereafter removed.

Thereafter, as the valve is moved from the lower closed position by means of raising the actuator toward the upper stop position, the springs 94, 96 increasingly deflect to provide a gradually increasing tensile load until further deflection is limited by engagement with the spacer member 98 at which time direct tensile forces are applied until the valve unseats. As the valve stem 14 translates up to the open backseated position, the load may be substantially equal to the weight of the stem and valve disc plus the resistance to movement. As the backseat 32 engages the surface 34, which due to the preloading of the springs will occur before the top surface of the actuator piston 13 engages the bottom surface of the stop collar 24, the backseat load is gradually increased as the springs deflect until such time as the stop position is reached and the preload established.

With the aforementioned arrangement, it will be appreciated that preloading may be affirmatively established by independent adjustment of the coupling quite apart from the axial variations between the backseat and the stop surface. This condition is affirmatively applied to the interconnection in a reliable and dependable manner. It is further assured that with this arrangement, any loadings applied to the stem during failure modes will not exceed the preloaded figure.

While only one form of the present invention has been shown and described, other forms will be readily apparent to those skilled in the art. Accordingly, the invention should not be limited by the embodiment selected for disclosure but only by the claims which follow.

What is claimed is:

1. A method of applying a predetermined loading between axially translatable first and second members having individual axial stop positions, comprising the steps of:
   (a) forming a coupling having first and second fittings respectively axially adjustably connectable to said first and second members and independently relatively axially movable between spaced surfaces of a lost motion connection, said coupling having spring means in said lost motion connection providing a predetermined loading when deflected a predetermined distance;
   (b) deflecting the spring means said predetermined distance by deflecting means camed by and engaging one of the fittings;
   (c) axially connecting one of the fittings to one of the members;
   (d) axially connecting the other of the fittings to the other of the members;
   (e) axially adjusting the fittings relative to the members to vary the distance therebetween until the members engage their respective stops positions and;
   (f) further axially adjusting the fittings relative to the members to further vary the distance until the deflecting means disengages.

2. The method recited in claim 1 comprising the further step of removing the deflecting means whereby thereafter the members may translate independently within the confines of the lost motion connection when removed from the stop positions with varying loads accommodated by deflecting of the spring means but when engaged at one stop position the loading between the members increases toward said predetermined loading as the other stop position is approached.

3. The method recited in claim 2 comprising the additional step of varying the distance between the spaced surfaces prior to deflecting the spring means so as to initially load the latter.

4. The method recited in claim 3 wherein one of the fittings is axially fixed to one of the members prior to axially adjusting the fittings.

5. The method recited in claim 4 wherein the other of the fittings is axially fixed to the other of the members after said further axially adjusting the fittings.

6. The method recited in claim 1 comprising the further step of ascertaining when the deflecting means is disengaged.

7. A method of limiting backseat loading on a valve moved by a valve stem between a lower closed position and an upper open position engaging a backseat by an actuator having an upper stop, said method comprising the steps of:
   (a) setting a coupling to a predetermined loading between a bearing surface thereof and gaging surface;
   (b) connecting the coupling to the valve stem in the lower closed position;
   (c) lowering the actuator from the upper stop;
   (d) connecting the coupling to the actuator;
   (e) raising the actuator to the upper stop with the backseat being below the upper open position, and
   (f) increasingly connecting the coupling to the valve stem and the actuator until the backseat is engaged and the predetermined loading exceeded by the gaging surface separating from the bearing surface.

* * * * *

UNITED STATES PATENT AND TRADEMARK OFFICE
CERTIFICATE OF CORRECTION

PATENT NO. : 4,106,170
DATED : August 15, 1978
INVENTOR(S) : E. Frederick Schoeneweis It is certified that error appears in the above-identified patent and that said Letters Patent are hereby corrected as shown below:

Column 2, line 4, after "take" delete 'only' and insert --up--.

Signed and Sealed this

Twenty-seventh Day of February 1979

[SEAL]

Attest:

RUTH C. MASON
Attesting Officer

DONALD W. BANNER
Commissioner of Patents and Trademarks